United States Patent [19]

Ericson

[11] 4,318,547
[45] Mar. 9, 1982

[54] DEVICES USED FOR THE CONNECTION OF PIPES

[76] Inventor: Kurt S. B. Ericson, 48, Prins Boudewijnlaan at B-2230, Schilde, Belgium

[21] Appl. No.: 145,729

[22] Filed: May 1, 1980

[30] Foreign Application Priority Data

May 4, 1979 [BE] Belgium .................................. 876033

[51] Int. Cl.$^3$ .......................... F16J 9/00; F16J 15/10; F16L 17/00
[52] U.S. Cl. ......................... 277/207 A; 277/DIG. 2; 285/3; 285/27; 285/110; 285/177
[58] Field of Search ...................... 277/207 A, 9.5, 11, 277/208, 32, 178, 207 R, DIG. 2, 209; 285/3, 4, 24, 27, 177, 110

[56] References Cited

U.S. PATENT DOCUMENTS

| | | | |
|---|---|---|---|
| 3,414,273 | 12/1968 | Sumner | 277/11 |
| 3,493,236 | 2/1970 | Kleindienst | 277/207 A |
| 3,654,965 | 4/1972 | Gramain | 285/4 |
| 3,857,589 | 12/1974 | Oostenbrink | 277/207 A |
| 3,913,928 | 10/1975 | Yamaguchi | 277/207 A |
| 4,211,423 | 7/1980 | Resech | 285/4 |

FOREIGN PATENT DOCUMENTS

| | | | |
|---|---|---|---|
| 1069239 | 5/1967 | United Kingdom | 285/110 |
| 163414 | 9/1969 | United Kingdom | 285/177 |

*Primary Examiner*—Robert I. Smith

[57] ABSTRACT

A device for the connection of pipes of whatever section or of pipes with elements forming part of a plant such as housings or tubular bodies of whatever section provided in automatic valves or other apparatus. The device comprises a muff of a flexible material provided on its inner periphery with a tightening membrane in the shape of a lip or of a hat. The device is characterized by cooperation with the lip of guiding or centering means for the pipes to be introduced. The guiding or centering means consist of a piece (6) formed of a series of rings (7, 8, 9) of different sizes which are coaxially maintained in their respective places by cross pieces (10). The outer ring (9) of the centering piece is connected by arms or holders (11) to a fixing collar (ring) (12) which in general is introduced into a groove (13) provided in the interior of the muff.

4 Claims, 4 Drawing Figures

DEVICES USED FOR THE CONNECTION OF PIPES

The present invention relates to devices for the connection of pipes or of pipes with elements such as housings or tubular bodies provided in automatic valves or other apparatus, for instance, those in conduits for the evacuation of sanitary waste water.

In apparatus of that kind, piping systems for different media (gas, liquids or mixtures) and purposes are constructed to transport these media in different quantities and capacities in the same construction or plant.

Now, use is made of pipes having different dimensions (diameters) and in order to execute connections between pipes there is a need of a big number of pieces or reductions corresponding to the different diameters.

The invention has for its object to give the possibility of connecting a pipe of whatever section or a tubular member having a given size or diameter with pipes or elements of different sizes or diameters by making use of very simple means so as to obtain a connection of an absolute universal type while enabling the obtention of an absolutely efficacious tightness and a perfect guiding or steering of the elements to be connected.

With this object in view, the device making the subject matter of the invention comprises a muff of a flexible material provided on its inner periphery with a tightening membrane in the form of a lip or of a hat, the device being essentially characterized in that with the lip cooperate guiding or steering and centering means for the pipes to be connected.

In the practical embodiment of the invention, there may be provided as guiding means a piece formed of a series of rings of different sizes or diameters which are coaxially maintained one with respect to the other by cross-pieces, the outer ring of the centering piece being connected by arms or holders to a fixing collar or ring which in general is introduced into a groove provided in the interior of the muff.

Figure 3:
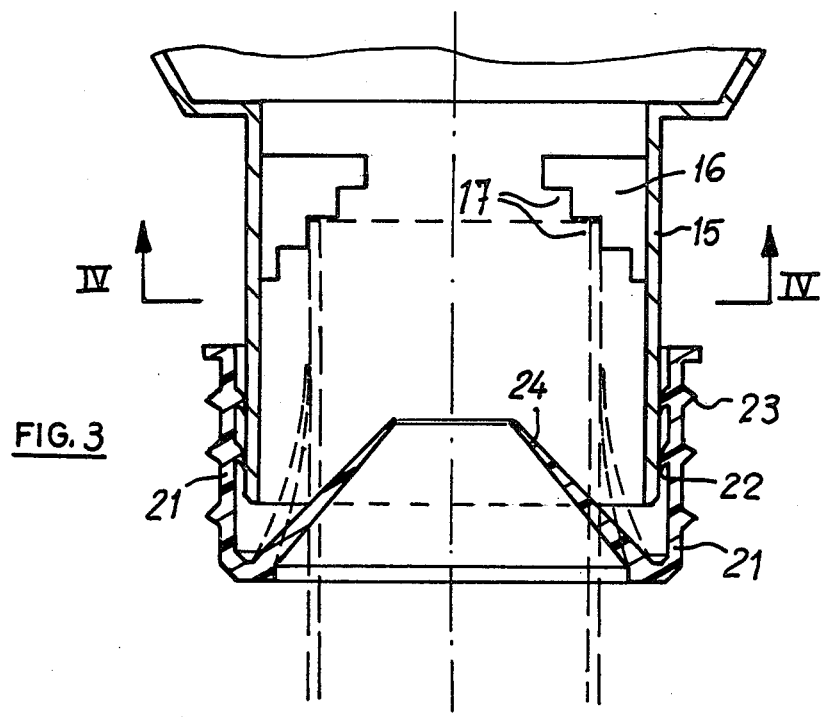
Figure 4:
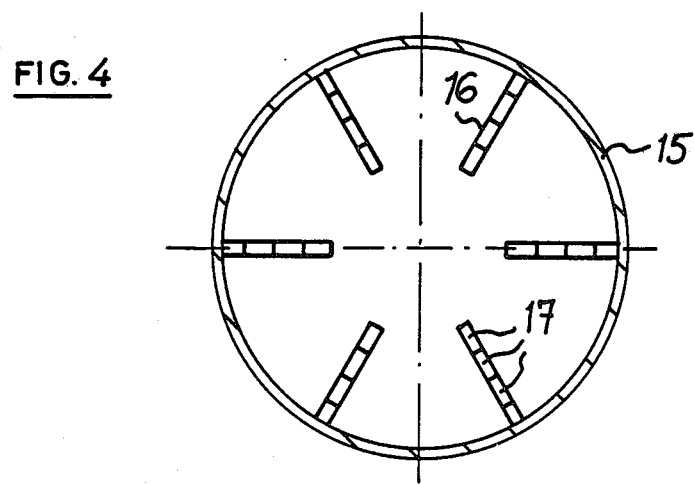

FIGS. 3 and 4 relate to a special application of the invention.

Figure 1:
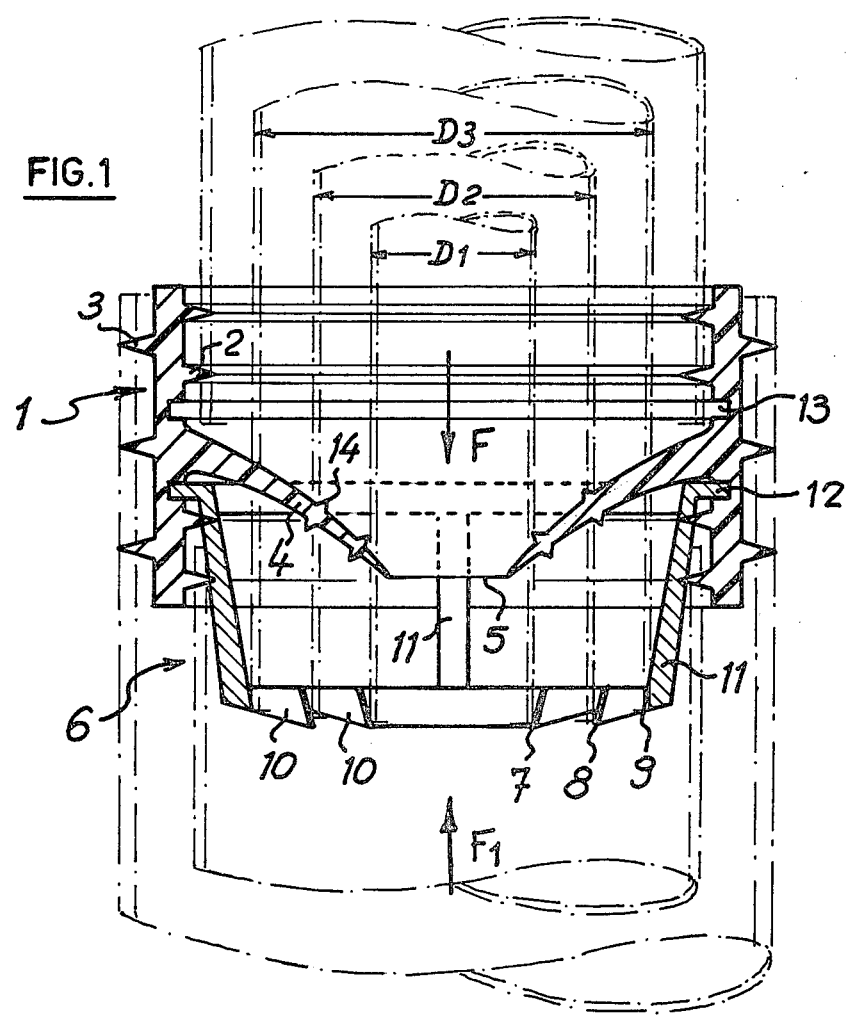
FIG. 1 is a cross-sectional view representing as an example a connecting muff with guiding piece.
Figure 2:
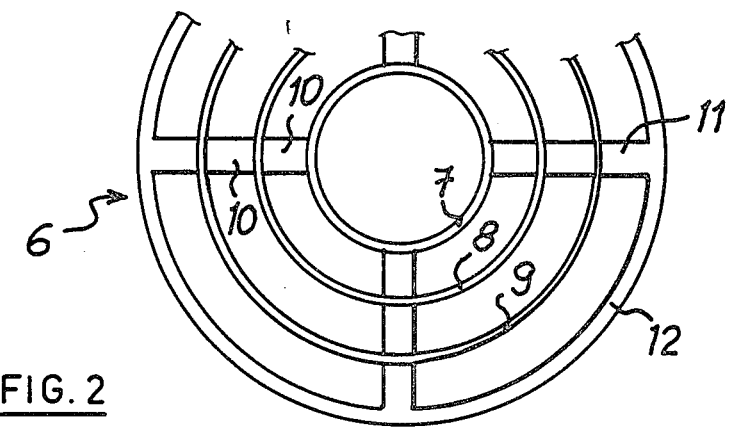
FIG. 2 is a plan view which represents a guiding or centering piece for a pipe having a smaller diameter than the diameter of the muff.

On FIG. 1 there has been represented a connecting piece formed of a muff or body 1 the inner and outer walls of which are in the example shown provided with peripheral teeth 2-3.

This piece is of a homogeneous flexible material generally of a plastic material.

Inside the body or muff 1 there is a flexible membrane 4 in the form of a lip which by its outer extremity is bodily connected with the inner wall of the muff 1 and which projects towards the longitudinal axis of the muff 1 leaving a central opening 5.

As shown on FIG. 1 in dotted lines, owing to the presence of this membrane it is possible to introduce in the interior of the muff 1 pipes of different diameters (D, $D_2$, $D_3$), those diameters being smaller than the inner diameter of the muff 1.

Whatever may be the diameter of the pipe which is introduced the lip 4 becomes deformed and tightly engages the pipe which has been introduced.

Obviously the diameters $D_1$, $D_2$, $D_3$ may have any whatever dimensions.

The muff 1 itself may be introduced in the inside of a pipe having a greater diameter. In this case the teeth 3 provided at the exterior of the muff will give the tightness.

The muff 1 may also be pushed on a pipe having a lower diameter; the inner teeth 2 serve in this case as tightening rings.

However this pushing is limited by the lip 4 situated in substance at the middle of the muff 1.

Due to the teeth 2,3, it is possible to obtain tightening connections taking care of the tolerances and overbridge variations in different norms (ASTH, SIS, ISO, etc.).

According to the invention in order to obtain an efficacious tightening connection between the lip 4 and a pipe of lower diameter, a guiding means for the latter is provided in order to maintain the pipe in an axial position in the muff 1.

In the case of FIG. 1 relating to the connection of pipe between themselves use is made of an element or piece 6 composed of a series of different steering rings 7, 8, 9 of different diameters coaxially maintained one with respect to the other by cross-pieces 10 bodily connected with those rings; the outer ring 9 being connected by arms or holders 11 with a fixing ring or collar 12 introduced into a groove inside the muff 1.

It will be easily understood that if the ring 7 having the smallest diameter is removed with the corresponding cross-pieces 10, for instance by cutting or breaking the same off a pipe of greater diameter ($D_2$) may be introduced, being guided by the ring 8 of greater diameter.

If a pipe of diameter $D_2$ is introduced in the device, the lip 4 will produce the tightness and if the pipe is pushed a bit further, it will be guided by the ring 8 corresponding to the diameter $D_2$.

On the lip 4, inside and outside of the latter, small annular teeth 14 may be provided in order to improve the tightening with respect to the pipe to be connected.

An important feature is that a groove 13 for the reception of the centering piece 6 may exist on each side of the lip 4 so as to enable the positioning of the guiding piece 6 in two different positions and consequently the introduction of pipes from one or the other direction (F or $F_1$).

As will be understood the invention permits to obtain an absolutely perfect connection due to the tightening elements themselves and to the steering.

Such a connection may be considered as being "universal" in a device such as represented in FIG. 1 comprising a muff 1 with teeth 2-3 and lip 4, whatever may be the diameters.

FIGS. 3 and 4 represent the connection between pipes of different diameters and a tubular body 15 of any whatever section (circular, polygonal, etc.) forming part of a plant of any kind.

A connecting piece 21 executed according to the same principles with teeth 22 on the inside and or teeth 23 on the outside and with a lip 24 is used.

The centering of the inner pipes is obtained in this case by providing on the inner periphery of the tubular body 15, projections 16 (in the number of six in the example) each comprising a staggered portion 17 for the reception of pipes of different diameters.

The connecting devices according to FIGS. 3 and 4 may be advantageously used in automatic valve devices for sanitary plants for the evacuation of waste water, for example for the valves described and claimed in "U.S. Pat. No. 4,232,706 of the applicant in which there is" made use of a single type of automatic valve for the connection of pipes of different diameters.

What I claim is:

1. A device for connecting tubular elements of different sizes, said device comprising a muff of flexible material provided on its inner periphery with a tightening membrane in the shape of a lip, and guiding or centering means for the tubular elements to be introduced, said means being constituted by a series of rings of different sizes which are coaxially maintained one with respect to the other by cross-pieces, the outer ring of said means being connected by arms to the muff.

2. A device as claimed in claim 1 in which said arms are connected to a fixing ring introduced into a groove on the inner periphery of the muff.

3. A device as claimed in claim 2 in which a groove for the reception of the means exists on each side of the membrane whereby the positioning of the means in two different positions and the introduction of pipes from one or the other direction is rendered possible.

4. Device according to claim 1 in which the inner and/or outer walls of the muff are provided with peripheral teeth in such a manner that when the muff is introduced inside a pipe of a greater or smaller size the outer or inner teeth of the muff respectively are used as tightening rings.

* * * * *